(12) United States Patent
Shin et al.

(10) Patent No.: US 8,155,311 B2
(45) Date of Patent: Apr. 10, 2012

(54) METHOD AND APPARATUS FOR ENCRYPTING MESSAGE FOR MAINTAINING MESSAGE INTEGRITY, AND METHOD AND APPARATUS FOR DECRYPTING MESSAGE FOR MAINTAINING MESSAGE INTEGRITY

(75) Inventors: Jun-bum Shin, Suwon-si (KR); Ji-soon Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 964 days.

(21) Appl. No.: 11/952,174

(22) Filed: Dec. 7, 2007

(65) Prior Publication Data

US 2008/0260147 A1 Oct. 23, 2008

(30) Foreign Application Priority Data

Apr. 17, 2007 (KR) .................. 10-2007-0037601

(51) Int. Cl.
 *H04L 9/00* (2006.01)
(52) U.S. Cl. ............. 380/46; 713/150; 713/181; 380/44
(58) Field of Classification Search .......... 713/150–152, 713/168–171, 181; 380/277–286, 44–45; 726/26
See application file for complete search history.

(56) References Cited

U.S. PATENT DOCUMENTS

| | | | | |
|---|---|---|---|---|
| 5,136,642 A | * | 8/1992 | Kawamura et al. | 380/282 |
| 5,631,961 A | * | 5/1997 | Mills et al. | 380/286 |
| 6,523,115 B1 | * | 2/2003 | Ono et al. | 713/181 |
| 2002/0023209 A1 | * | 2/2002 | Domstedt et al. | 713/160 |
| 2002/0046343 A1 | * | 4/2002 | Deo et al. | 713/189 |
| 2002/0071553 A1 | | 6/2002 | Shirai et al. | |
| 2003/0084003 A1 | * | 5/2003 | Pinkas et al. | 705/71 |
| 2006/0034453 A1 | | 2/2006 | Liu | |
| 2006/0080536 A1 | * | 4/2006 | Teppler | 713/176 |
| 2006/0277415 A1 | * | 12/2006 | Staring et al. | 713/193 |
| 2006/0285684 A1 | * | 12/2006 | Rogaway | 380/37 |
| 2007/0122004 A1 | * | 5/2007 | Brown et al. | 382/115 |
| 2009/0080647 A1 | * | 3/2009 | Mantin et al. | 380/29 |

FOREIGN PATENT DOCUMENTS

| | | | |
|---|---|---|---|
| GB | 2397203 A | | 7/2004 |
| KR | 10-2004-0009766 | * | 1/2004 |

OTHER PUBLICATIONS

Bellare M et al Online ciphers and the hash-CBC construction, Springer-Verlag Berlin, Germany, 2001, pp. 292-309, XP002484552.

Tadayoshi Kohno et al, CWC: A High-Performance Conventional Authenticated Encryption Mode, Springer-Verlag, BE, vol. 3017, Jan. 1, 2004 pp. 408-426.

* cited by examiner

*Primary Examiner* — Kim Vu
*Assistant Examiner* — Darren B Schwartz
(74) *Attorney, Agent, or Firm* — Sughrue Mion, PLLC

(57) ABSTRACT

A method of encrypting a message for message integrity is provided. In the method, a random number is generated, a first ciphertext is generated by encrypting the message by using the generated random number, a hash value of the first ciphertext is calculated, an encryption key is generated by using the hash value of the first ciphertext and a shared key, a second ciphertext is generated by encrypting the random number by using the encryption key, and the first and second ciphertexts are combined.

21 Claims, 11 Drawing Sheets

METHOD AND APPARATUS FOR ENCRYPTING MESSAGE FOR MAINTAINING MESSAGE INTEGRITY, AND METHOD AND APPARATUS FOR DECRYPTING MESSAGE FOR MAINTAINING MESSAGE INTEGRITY

CROSS-REFERENCE TO RELATED PATENT APPLICATION

This application claims priority from Korean Patent Application No. 10-2007-0037601, filed on Apr. 17, 2007, in the Korean Intellectual Property Office, the disclosure of which is incorporated herein in its entirety by reference.

BACKGROUND OF THE INVENTION

1. Field of the Invention

Methods and apparatuses consistent with the present invention relate to encrypting a message, and more particularly to encrypting a message for maintaining message integrity.

2. Description of the Related Art

Recently, an encryption algorithm has been widely used so as to protect data. Typically, the encryption algorithm is used to guarantee security, integrity, and authentication.

The security indicates that only predetermined individuals can use the data. The integrity indicates whether data is altered or not while processing the data. The authentication indicates by whom data is generated.

In order to guarantee security of data, an encryption algorithm has been widely used. In order to guarantee integrity of data, a hash algorithm, a message authentication code (MAC), and a digital signature may be used. In order to guarantee authentication, the MAC or digital signature may be used. In order to guarantee all of them, a combination of them may be used.

For example, in order to guarantee security and integrity for a message M, as shown in Equation 1, data processed by using the MAC, the hash function, and the like may be used.

$$E_k[M], MAC_k(M) \, E_k[M], MAC_k(E_k[M]) \, E_k[M,H(M)] \quad \text{[Equation 1]}$$

That is, first data of Equation 1 is obtained by encrypting the message M by using a private key K, calculating a MAC for the message M, and combining the encrypted message $E_k[M]$ with the $MAC_k(M)$ which is MAC for the message M.

In addition, second data of Equation 1 is obtained by encrypting the message M by using the private key K, calculating a MAC for the encrypted message $E_k[M]$, and combining the encrypted message $E_k[M]$ with the $MAC_k(E_k[M])$ which is MAC for the encrypted message $E_k[M]$.

Finally, third data is obtained by encrypting the message M and a hash value H(M) of the message M by using the private key K.

It is possible to guarantee the security and integrity of data by constructing the transmitted data as shown in Equation 1. That is, since only a user who has a private key K can extract the message M by decrypting the encrypted data by using the private key K, it is possible to achieve the security of the data. In addition, it is possible to guarantee the integrity of the data from a characteristic (collision free) of the MAC and the hash function.

However, in the aforementioned related art encryption method, it is impossible to protect data against an attack, when an attacker attacks the data by intentionally omitting a procedure of examining whether the integrity of the transmitted data is maintained.

In addition, in the related art technique, in order to safely delete the data of which the integrity is broken, the data is overwritten with 0 or 1 many times (for example, seven times). However, when the size of the data of which security is broken is large or when the number of the data of which security is broken is large, the overwriting procedure may overload a system. In this case, it is inefficient to perform the overwrite procedure.

SUMMARY OF THE INVENTION

The present invention provides a method and apparatus for encrypting a message in order to maintain the integrity of the message capable of preventing encrypted message of which integrity is broken from being reused.

According to an aspect of the present invention, there is provided a method of encrypting a message of an encryption apparatus in order to maintain integrity of the message, the method including: generating a random number and generating a first ciphertext by encrypting the message by using the random number; calculating a hash value of the first ciphertext and generating an encryption key by using the hash value of the first ciphertext and a predetermined shared key; generating a second ciphertext by encrypting the random number by using the encryption key; and combining the first ciphertext and the second ciphertext.

The method may further include: calculating a hash value of the message; and generating an authentication code for the hash value of the message by using the encryption key, wherein in the combining of the first ciphertext and the second ciphertext, the first ciphertext, the second ciphertext, and the authentication code for the hash value of the message are combined.

The method may further include generating an authentication code for the hash value of the first ciphertext, wherein in the combining of the first ciphertext and the second ciphertext, the first ciphertext, the second ciphertext, and the authentication code for the hash value of the first ciphertext are combined.

The authentication code is constructed by using a MAC.

The method may further include: calculating a hash value of the message; and generating a third ciphertext by encrypting the hash value of the message by using a private key of the encryption apparatus, wherein in the combining of the first ciphertext and the second ciphertext, the first, the second, and the third ciphertext are combined.

The method may further include generating a third ciphertext by encrypting the hash value of the first ciphertext by using a private key of the encryption apparatus, wherein in the combining of the first ciphertext and the second ciphertext, the first, the second, and the third ciphertext are combined.

In the generating of the encryption key, the encryption key is generated by using a key derivation function (KDF), which generates the encryption key, having the hash value of the encrypted message and the shared key as inputs, and wherein the KDF is shared by the encryption apparatus and a decryption apparatus which decrypts the message generated by the encryption apparatus.

The predetermined shared key may be shared by the encryption apparatus and a decryption apparatus which decrypts the message generated by the encryption apparatus.

The message includes at least one of texts, audios, videos and images.

According to another aspect of the present invention, there is provided a method of encrypting a message of an encryption apparatus in order to maintain integrity of the message, the method including: generating a plurality of message blocks by dividing the message into the plurality of message blocks; generating a random number and encrypting the plurality of message blocks in a cipher block chaining (CBC) mode of the advanced encryption standard (AES) by using the random number in order to produce a plurality of encrypted message blocks; generating an encryption key by using a part of the plurality of encrypted message blocks and a predetermined shared key; generating a first ciphertext by combining the plurality of encrypted message blocks; generating a second ciphertext by encrypting the random number by using the encryption key; and combining the first ciphertext and the second ciphertext.

The method may further include generating a third ciphertext by encrypting the part of the plurality of encrypted message blocks by using the encryption key or a private key of the encryption apparatus, wherein in the combining of the first ciphertext and the second ciphertext, the first, the second, and the third ciphertext are combined.

The part of the plurality of encrypted message blocks may be the encrypted message block which is generated the last among the plurality of encrypted message blocks.

The predetermined shared key is shared by the encryption apparatus and a decryption apparatus which decrypts the message generated by the encryption apparatus.

According to another aspect of the present invention, there is provided a method of decrypting an encrypted message in order to maintain integrity of the message, the method including: receiving the encrypted message obtained by combining a first ciphertext and a second ciphertext, wherein the first ciphertext is obtained by encrypting a message by using a predetermined random number, and wherein the second ciphertext is obtained by encrypting the predetermined random number by using an encryption key that is generated by using a hash value of the first ciphertext and a predetermined shared key; separating the first ciphertext and the second ciphertext of the received encrypted message from each other and calculating the hash value of the first ciphertext; generating a decryption key by using the hash value of the first ciphertext and the predetermined shared key; extracting the predetermined random number by decrypting the second ciphertext by using the decryption key; and decrypting the first ciphertext by using the predetermined random number.

The method may further include determining whether the encrypted message is altered, when receiving the encrypted message combined with an authentication code for the hash value of the first ciphertext generated by using the encryption key or the encrypted message combined with a third ciphertext obtained by encrypting the hash value of the first ciphertext, in the receiving of the message, wherein in the extracting of the random number, the second ciphertext is selectively decrypted based on the determination result.

The determining whether the received message is altered includes: generating an authentication code for the hash value of the first ciphertext by using the decryption key when the received message is further combined with the authentication code; and determining whether the received message is altered by comparing the authentication code generated by using the decryption key with the received authentication code.

The determining whether the received message is altered includes: decrypting the third ciphertext by using a public key corresponding to the private key when the received message is further combined with the third ciphertext; and determining whether the received message is altered by comparing the hash value of the first ciphertext extracted by decrypting the third ciphertext and the hash value of the first ciphertext calculated from the received first ciphertext.

According to another aspect of the present invention, there is provided a method of decrypting an encrypted message in order to maintain integrity of the message, the method including: receiving the encrypted message obtained by combining a first ciphertext and a second ciphertext, wherein the first ciphertext is obtained by combining a plurality of encrypted message blocks obtained by encrypting a plurality of message blocks by using a predetermined random number in a CBC (cipher block chaining) mode of AES (advanced encryption standard), and wherein the second ciphertext is generated by encrypting the predetermined random number by using a predetermined encryption key; separating the first ciphertext and the second ciphertext of the received encrypted message from each other and generating a decryption key by using a part of the plurality of encrypted message blocks included in the first ciphertext and a predetermined shared key; extracting the predetermined random number by decrypting the second ciphertext by using the decryption key; and decrypting the first ciphertext by using the extracted random number in the CBC mode of AES and generating a decrypted message by combining a plurality of decrypted message blocks, wherein the encryption key is generated by using the part of the plurality of encrypted message blocks included in the first ciphertext and the predetermined shared key.

The receiving of the message further includes determining whether the received message is altered, when receiving a message further combined with a third ciphertext encrypted by using the encryption key or a private key of the encryption apparatus which performs the encryption, and wherein in the extracting of the random number, the second ciphertext is selectively decrypted based on the determination result.

The determining whether the received message is altered includes: decrypting the third ciphertext by using the encryption key when the received message is further combined with the third ciphertext encrypted by using the encryption key; and determining whether the received message is altered by comparing a result value obtained by decrypting the third ciphertext with the part of the plurality of message blocks included in the received first ciphertext used to generate the encryption key.

The determining whether the received message is altered includes: decrypting the third ciphertext by using a public key corresponding to the private key, when the received message is further combined with the third ciphertext encrypted by using the private key; and determining whether the received message is altered by comparing a result value obtained by decrypting the third ciphertext with the part of the plurality of message blocks included in the received first ciphertext used to generate the encryption key.

According to another aspect of the present invention, there is provided an encryption apparatus for encrypting a message in order to maintain integrity of the message, the encryption apparatus including: a random number generation unit generating a random number; an encryption unit encrypting the message by using the random number and generating a first ciphertext; an operation unit calculating a hash value of the first ciphertext; an encryption key generation unit generating an encryption key by using the hash value of the first ciphertext and a predetermined shared key; and a combination unit combining the first ciphertext with a second ciphertext, wherein the second ciphertext is generated by encrypting the random number by using the encryption key.

The encryption apparatus may further include an authentication code generation unit; wherein the operation unit calculates the hash value of the message; wherein the authentication code generation unit generates an authentication code for a hash value of the message by using the encryption key;

and wherein the combination unit combines the first ciphertext, the second ciphertext and the authentication code.

According to another aspect of the present invention, there is provided an encryption apparatus for encrypting a message in order to maintain integrity of the message, the encryption apparatus including: a message division unit generating a plurality of message blocks by dividing the message into the plurality of message blocks; a random number generation unit generating a random number; an encryption unit encrypting the plurality of message blocks in a CBC (cipher block chaining) mode of AES (advanced encryption standard) by using the random number in order to produce a plurality of encrypted message blocks; an encryption key generation unit generating an encryption key by using a part of the plurality of encrypted message blocks and a predetermined shared key; and a combination unit combining a first ciphertext and a second ciphertext, wherein the first ciphertext is generated by combining the plurality of encrypted message blocks, and wherein the second ciphertext is generated by encrypting the random number.

According to another aspect of the present invention, there is provided a decryption apparatus for decrypting an encrypted message in order to maintain integrity of the message, the decryption apparatus including: a receiving unit receiving the encrypted message obtained by combining a first ciphertext and a second ciphertext, wherein the first ciphertext obtained by encrypting a message by using a predetermined random number, and wherein the second ciphertext is obtained by encrypting the predetermined random number by using an encryption key generated by using a hash value of the first ciphertext and a predetermined shared key; a message separation unit separating the first ciphertext and the second ciphertext of the received encrypted message from each other; an operation unit calculating the hash value of the first ciphertext; a decryption key generation unit generating a decryption key by using the hash value of the first ciphertext and the predetermined shared key; and a decryption unit extracting the predetermined random number by decrypting the second ciphertext by using the decryption key and decrypting the first ciphertext by using the predetermined random number.

The decryption apparatus may further include an authentication unit determining whether the encrypted message is altered, when the receiving unit receives the encrypted message combined with an authentication code for the hash value of the first ciphertext generated by using the encryption key or the encrypted message combined with a third ciphertext obtained by encrypting the hash value of the first ciphertext, wherein the decryption unit selectively decrypts the second ciphertext based on the determination result.

The authentication unit includes: an authentication code generation unit generating an authentication code for the hash value of the first ciphertext by using the decryption key, when the encrypted message is further combined with the authentication code; and a determination unit determining whether the encrypted message is altered by comparing the authentication code generated by using the decryption key with the authentication code.

According to another aspect of the present invention, there is provided a decryption apparatus for decrypting an encrypted message in order to maintain integrity of the message, the decryption apparatus including: a receiving unit receiving the encrypted message obtained by combining a first ciphertext and a second ciphertext, wherein the first ciphertext is obtained by combining a plurality of encrypted message blocks obtained by encrypting a plurality of message blocks by using a predetermined random number in a CBC (cipher block chaining) mode of AES (advanced encryption standard), and wherein the second ciphertext is generated by encrypting the predetermined random number by using a predetermined encryption key; a message separation unit separating the first ciphertext and the second ciphertext of the encrypted message from each other; a decryption key generation unit generating a decryption key by using a part of the plurality of message blocks included in the first ciphertext and a predetermined shared key; a decryption unit extracting the predetermined random number by decrypting the second ciphertext by using the decryption key and decrypting the first ciphertext by using the predetermined random number in the CBC mode of AES; and a combination unit generating a message by combining a plurality of decrypted message blocks, wherein the encryption key is generated by using the part of the plurality of message blocks included in the first ciphertext and the predetermined shared key.

The decryption apparatus may further include an authentication unit determining whether the encrypted message is altered, when the receiving unit receives the encrypted message further combined with a third ciphertext obtained by encrypting the part of the plurality of message blocks included in the first ciphertext by using the encryption key or a private key of an encryption apparatus which performs the encryption, wherein the decryption unit selectively decrypts the second ciphertext based on the determination result.

BRIEF DESCRIPTION OF THE DRAWINGS

The above and other aspects of the present invention will become more apparent by describing in detail exemplary embodiments thereof with reference to the attached drawings, in which.

DETAILED DESCRIPTION OF EXEMPLARY EMBODIMENTS

Hereinafter, the present invention will be described in detail by explaining exemplary embodiments of the invention with reference to the attached drawings.

Figure 1:
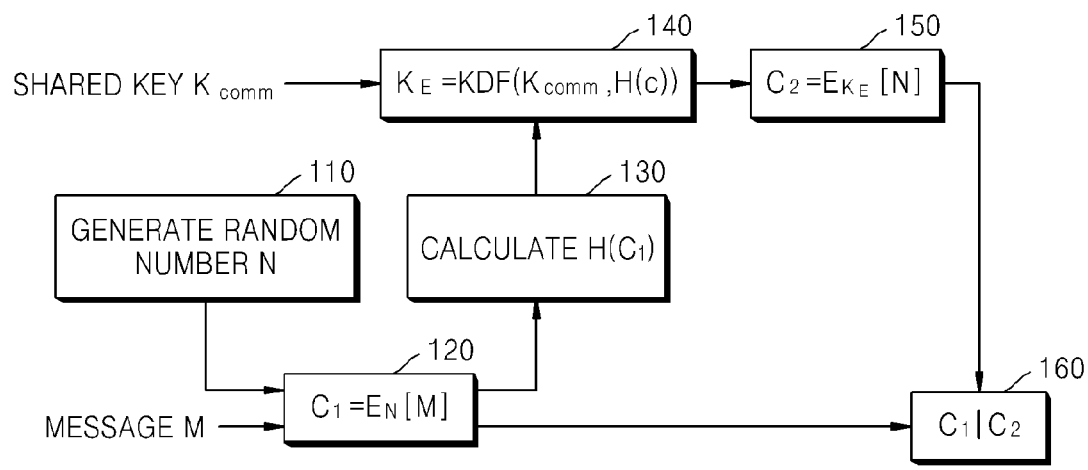
FIG. 1 illustrates a method of encrypting a message in order to maintain the integrity of the message according to a first exemplary embodiment of the present invention.

FIG. 1 illustrates a method of encrypting a message in order to maintain the integrity of the message according to a first exemplary embodiment of the present invention.

In operation 110, a random number N is generated.

In operation 120, a first ciphertext $C_1$ is generated by encrypting a message M by using the generated random number N.

At this time, the message may include texts, audios, videos, and images.

The first ciphertext is represented by $C_1 = E_N[M]$.

In operation 130, a hash value $H(C_1)$ of the first ciphertext $C_1$ is calculated.

In operation 140, an encryption key $K_E$ is generated by using the hash value $H(C_1)$ of the first ciphertext $C_1$ and a shared key $K_{comm}$.

Here, the shared key $K_{comm}$ is shared by an encryption apparatus for performing the method of encrypting a message in order to maintain the integrity of the message according to the exemplary embodiment of the present invention, and a decryption apparatus for decrypting the message generated by the encryption apparatus.

As shown in FIG. 1, the encryption key $K_E$ can be generated by using a key derivation function (KDF) having the hash value $H(C_1)$ of the first ciphertext $C_1$ and the shared key $K_{comm}$ as inputs.

At this time, the KDF function is shared by the encryption apparatus for performing the method of encrypting a message in order to maintain the integrity of the message according to the exemplary embodiment of the present invention, and the decryption apparatus for decrypting the message generated by the encryption apparatus. That is, if inputs are the same, the same key can be generated in the encryption and decryption apparatuses.

In the exemplary embodiment, if the first ciphertext $C_1$ is altered by an attacker, the encryption key $K_E$ is also altered, since the hash value $H(C_1)$ of the first ciphertext $C_1$ is used to generate the encryption key $K_E$.

In a case where the first ciphertext $C_1$ is altered by an attacker, if the decryption apparatus generates a decryption key by using the KDF, the decryption key is different from the encryption key $K_E$. When the message encrypted by using the encryption key $K_E$ is decrypted by using the aforementioned decryption key, a new message different from the original message is obtained. Accordingly, in the exemplary embodiment of the present invention, it is possible to maintain the message integrity by using the aforementioned characteristic.

In operation 150, a second ciphertext is generated by encrypting the random number N by using the encryption key $K_E$.

At this time, the second ciphertext $C_2$ can be represented by
$C_2 = E_{K_E}[N]$ In operation 160, the first and second ciphertexts $C_1$ and $C_2$ are combined.

On the other hand, in the method of encrypting a message in order to maintain the integrity of the message according to the exemplary embodiment, a message may be encrypted by including an authentication code for determining whether the encrypted message is altered.

Figure 2:
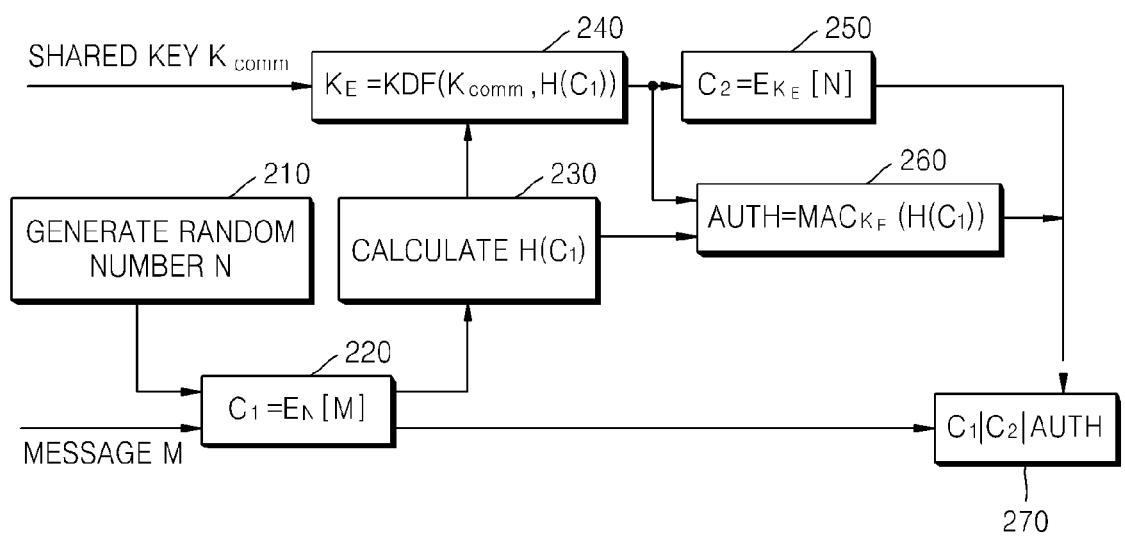
FIG. 2 illustrates a method of encrypting a message in order to maintain the integrity of the message according to a second exemplary embodiment of the present invention.

FIG. 2 illustrates a method of encrypting a message in order to maintain the integrity of the message according to a second exemplary embodiment of the present invention.

Since operations 210 to 250 of FIG. 2 are the same as operations 110 to 150 of FIG. 1, descriptions on operations 210 to 250 are omitted.

In operation 260, an authentication code AUTH for the hash value of the first ciphertext $C_1$ is generated by using the encryption key $K_E$.

At this time, the authentication code is used to check whether the hash value $H(C_1)$ of the first ciphertext $C_1$ is altered. As shown in FIG. 2, the authentication code may be constructed as $AUTH = MAC_{K_E}(H(C_1))$ by using a MAC. The authentication code is not limited thereto. The authentication code may be generated by using all the functions capable of checking the message integrity.

In addition, the authentication code may be constructed not as an authentication code for the hash value $H(C_1)$ of the first ciphertext $C_1$ but as an authentication code $AUTH = MAC_{K_E}(H(M))$ for a hash value $H(M)$ of the message. However, in order to use the authentication code for the hash value $H(M)$ of the message, the hash value $H(M)$ of the message needs to be separately calculated. Accordingly, if the authentication code for the hash value $H(C_1)$ of the first ciphertext $C_1$ is used, the calculation amount is reduced.

On the other hand, it is possible to generate a third ciphertext $C_3$ which performs the same function as the authentication code according to another exemplary embodiment.

For example, it is possible to generate the third ciphertext $C_3$ by encrypting the hash value $H(C_1)$ of the first ciphertext $C_1$ by using a private key KPRIV of the encryption apparatus for performing the method of encrypting a message in order to maintain the integrity of the message according to the other exemplary embodiment.

At this time, the third ciphertext $C_3$ may be represented as $C_3 = E_{K_{priv}}[H(C_1)]$.

In addition, when generating the third ciphertext $C_3$, the hash value $H(M)$ of the message may be used instead of the hash value $H(C_1)$ of the first ciphertext $C_1$.

In operation 270, the first and second ciphertexts $C_1$ and $C_2$ and the authentication code AUTH are combined.

On the other hand, when generating the encryption key $K_E$, the same effect can be achieved by generating the encryption key $K_E$ by using an arbitrary value, which is altered depending on whether the first ciphertext $C_1$ is altered, instead of the hash value $H(C_1)$ of the first ciphertext $C_1$.

Figure 3:
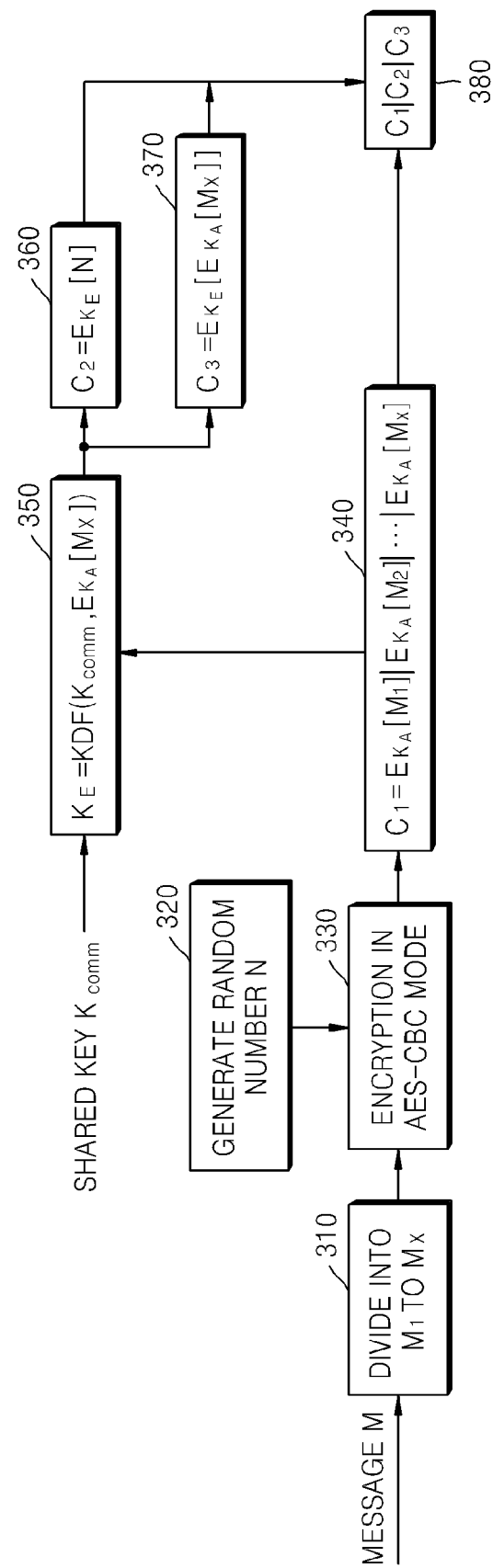
FIG. 3 illustrates a method of encrypting a message in order to maintain the integrity of the message according to a third embodiment of the present invention.

FIG. 3 illustrates a method of encrypting a message in order to maintain the integrity of the message according to a third exemplary embodiment of the present invention.

In operation 310, a plurality of message blocks are generated by dividing the message into a plurality of blocks.

In operation 320, a random number N is generated.

In operation 330, the plurality of message blocks are encrypted by using the generated random number N in a cipher block chaining (CBC) mode of the advanced encryption standard (AES).

Figure 4:
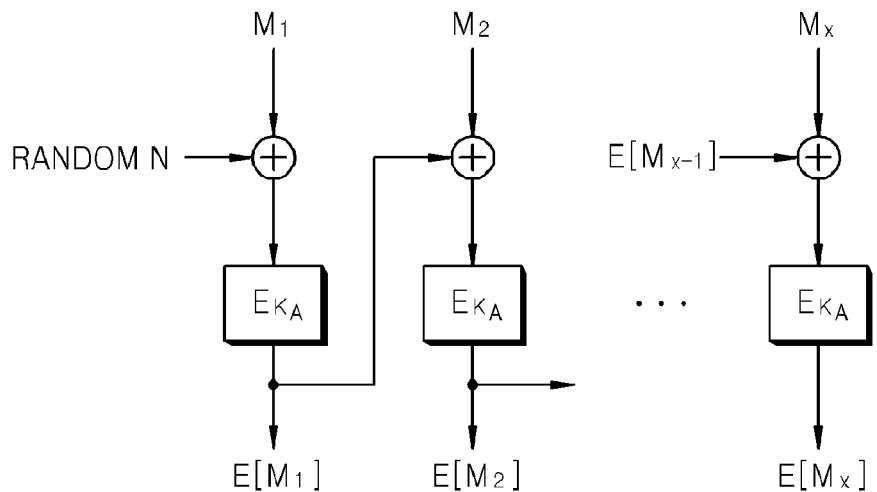
FIG. 4 illustrates an encryption method in the CBC mode of the AES.

FIG. 4 illustrates an encryption method in a CBC mode of the AES.

Referring to FIG. 4, the message blocks $M_1$ to $M_x$ are sequentially encrypted through AES encryption.

That is, when a value obtained by adding the random number N to a first message block $M_1$ is encrypted into a value $E_{K_A}(M_1)$ by using the encryption key $K_A$ in the CBC mode of the AES, a value obtained by adding the encrypted value $E_{K_A}(M_1)$ to a second message block $M_2$ is encrypted into a value $E_{K_A}[M_2]$ by using the encryption key $K_A$ in the CBC mode of the AES. As described above, the encryption result of the message block is used to encrypt the next message block. Accordingly, encrypted messages $E_{K_A}(M_1)$ to $E_{K_A}[M_x]$ are generated by using the message blocks $M_1$ to $M_x$.

When the message blocks are encrypted in the CBC mode of the AES, the encryption result of the message block is used to encrypt the next message block. If the one of the encrypted message blocks is changed, the encryption results of the following message blocks are changed. In this exemplary embodiment of the present invention, as described in the following, the authentication key is generated by using a part of the encrypted message blocks so as to maintain message integrity.

In operation 340, a first ciphertext $C_1$ is generated by combining the plurality of encrypted message blocks which are encrypted in the CBC mode of the AES.

In operation 350, an encryption key $K_E$ is generated by using a part of the message blocks included in the first ciphertext $C_1$ and the shared key.

At this time, the part of the message blocks in the first ciphertext $C_1$ may be one or more message blocks. In this case, there has to be a rule for determining which message block included in the first ciphertext $C_1$ is used to generate the encryption key $K_E$. For example, there is a rule that a message block located at the center or a twentieth message block among the plurality of encrypted message blocks is used. The decryption key is generated by using the previously predetermined message block.

Preferably, but not necessarily, as shown in FIG. 3, the part of the message blocks in the first ciphertext $C_1$ may be the lastly generated message block in the first ciphertext $C_1$. In a case where the lastly generated message block is used to generate the encryption key $K_E$, the value of the last message block is always changed, if any of the plurality of the message blocks is changed. If there is an alteration in the message caused by an attacker, the authentication key is always altered. Accordingly, it is effective in maintaining message integrity to use the lastly generated message block so as to generate the encryption key $K_E$.

In operation 360, a second ciphertext $C_2$ is generated by encrypting the random number N by using the encryption key $K_E$.

In operation 370, a third ciphertext $C_3$ is generated by encrypting a predetermined message block $E_{K_A}(M_x)$ included in the first ciphertext $C_1$.

The aforementioned third ciphertext $C_3$ is used to determine the message integrity in the decryption procedure. The procedure of determining the message integrity by using the third ciphertext $C_3$ will be described with reference to FIG. 7.

However, operation 370 may be omitted according to an exemplary embodiment.

In operation 380, the first to third ciphertexts $C_1$ to $C_3$ are combined.

At this time, when the third ciphertext $C_3$ is not generated by omitting operation 370, only the first and second ciphertexts $C_1$ and $C_2$ are combined.

Up to now, the method of encrypting a message in order to maintain the integrity of the message according to the exemplary embodiment has been described. Hereinafter, referring to FIGS. 5 to 7, a method of decrypting a message in order to maintain the integrity of the message according to an exemplary embodiment of the present invention will be described.

Figure 5:
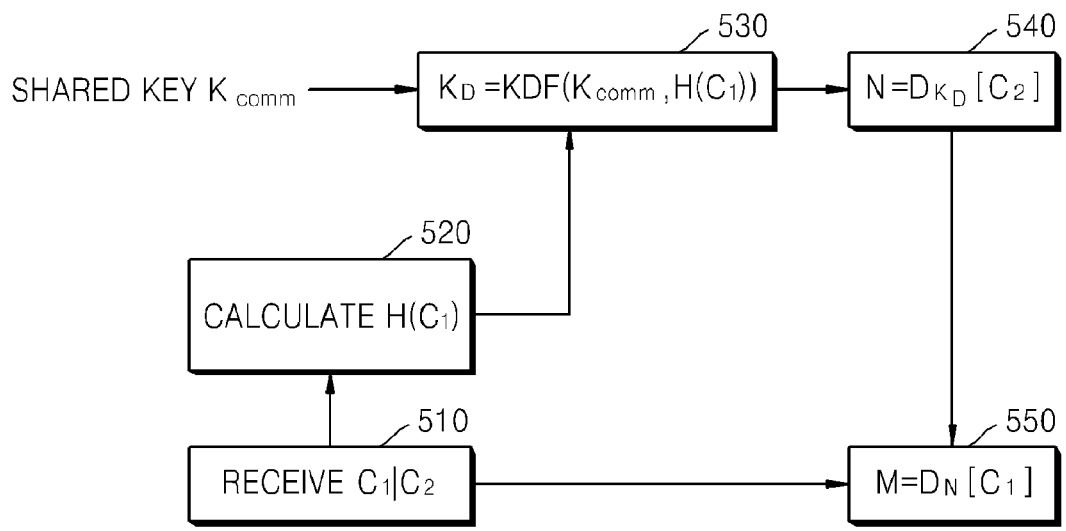
FIG. 5 illustrates a method of decrypting a message in order to maintain the integrity of the message according to a fourth exemplary embodiment of the present invention.

FIG. 5 illustrates a method of decrypting a message in order to maintain the integrity of the message according to a fourth exemplary embodiment of the present invention.

In operation 510, a message obtained by combining a first ciphertext $C_1$ encrypted by using a random number N and a second ciphertext $C_2$ encrypted by using a encryption key $K_E$ is received.

At this time, the encryption key $K_E$ is generated by using the hash value $H(C_1)$ of the first ciphertext $C_1$ and the shared key $K_{comm}$.

In operation 520, the first and second ciphertexts $C_1$ and $C_2$ of the received message are separated from each other. The hash value $H(C_1)$ of the separated first ciphertext $C_1$ is calculated.

In operation 530, a decryption key $K_D$ is generated by using the hash value $H(C_1)$ of the first ciphertext $C_1$ and the shared key $K_{comm}$.

At this time, the decryption key $K_D$ can be generated by using the KDF having the hash value $H(C_1)$ of the first ciphertext $C_1$ and the shared key $K_{comm}$ as inputs.

As described above, if the received encrypted message is not altered, the decryption key generated by using the KDF has to have the same value as the encryption key $K_E$. However, if the received encrypted message is altered, since the hash value $H(C_1)$ of the first ciphertext $C_1$ is altered, the decryption key $K_D$ has a different value from the encryption key $K_E$.

In operation 540, a random number N is extracted by decrypting the second ciphertext $C_2$ by using the decryption key $K_D$.

In operation 550, the first ciphertext $C_1$ is decrypted by using the extracted random number N.

At this time, if the encrypted message is not altered, a message M obtained by decrypting the first ciphertext $C_1$ has the same value as the original message M. If the encrypted message is altered, the message M obtained by decrypting the first ciphertext $C_1$ has a value irrelevant to the original message M.

Accordingly, if the encrypted message is altered, since the decrypted result is not the desired result but meaningless data constructed with random numbers, the user can recognize that the data is altered.

As described above, if the data is altered, the decrypted result has a meaningless value irrelevant to the original message. Accordingly, it is unnecessary to overwrite the altered data many times so as to safely delete the altered data. It is necessary to delete the altered data once.

On the other hand, the method of decrypting the message in order to maintain the integrity of the message according to the exemplary embodiment further includes a procedure of determining whether the encrypted message is altered.

Figure 6:
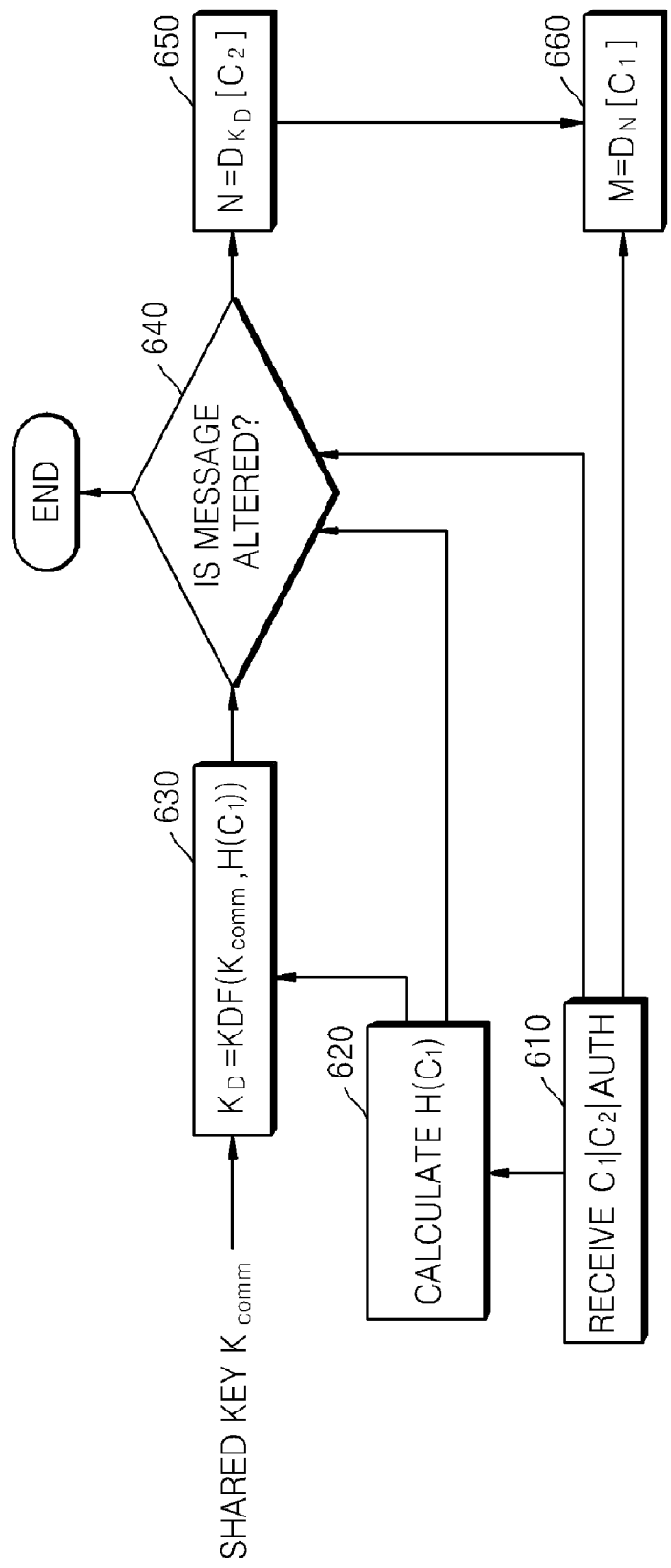
FIG. 6 illustrates a method of decrypting a message in order to maintain the integrity of the message according to a fifth exemplary embodiment of the present invention.

FIG. 6 illustrates a method of decrypting a message in order to maintain the integrity of the message according to a fifth exemplary embodiment of the present invention.

In operation 610, a message obtained by combining a first ciphertext $C_1$ encrypted by using a random number N, a second ciphertext $C_2$ encrypted by using a encryption key $K_E$, and an authentication code AUTH for a hash value of the first ciphertext $C_1$ is received.

At this time, a third ciphertext $C_3$ obtained by encrypting the hash value of the first ciphertext $C_1$ by using a private key of the encryption apparatus which encrypts the received message may be received instead of the authentication code AUTH for the hash value of the first ciphertext $C_1$. At this time, the third ciphertext $C_3$ may be represented by $C_3 = E_{K_{priv}}[H(C_1)]$.

In operation 620, the hash value $H(C_1)$ of the first ciphertext $C_1$ is calculated.

In operation 630, the decryption key $K_D$ is generated by using the hash value $H(C_1)$ of the first ciphertext $C_1$ and the shared key $K_{comm}$. In operation 640, it is determined by using the hash value $H(C_1)$ of the first ciphertext $C_1$ whether the received message is altered. At this time, the procedure of determining whether the received message is altered will be described.

First, the authentication code $MAC_{K_D}(H(C_1))$ for the hash value $H(C_1)$ of the first ciphertext $C_1$ is generated by using the decryption key $K_D$.

Next, it is determined whether the authentication code generated by using the decryption key $K_D$ is the same as the received authentication code AUTH.

At this time, if the both values are the same, it is determined that the message is not altered. Otherwise, it is determined that the message is altered.

As the result of determination, if it is determined that the received message is altered, the following decryption procedures are stopped.

On the other hand, when receiving the third ciphertext $C_3$, the third ciphertext $C_3$ is decrypted by using a public key corresponding to a private key of the encryption apparatus which encrypts the third ciphertext $C_3$. It is determined whether the message is altered by comparing the hash value $H(C_1)$ of the first ciphertext $C_1$ extracted in the decoding of the third ciphertext $C_3$ with the hash value $H(C_1)$ calculated from the received first ciphertext $C_1$.

Since operations 650 and 660 are the same as operations 540 and 550 of FIG. 5, descriptions on operations 650 and 660 will be omitted.

Figure 7:
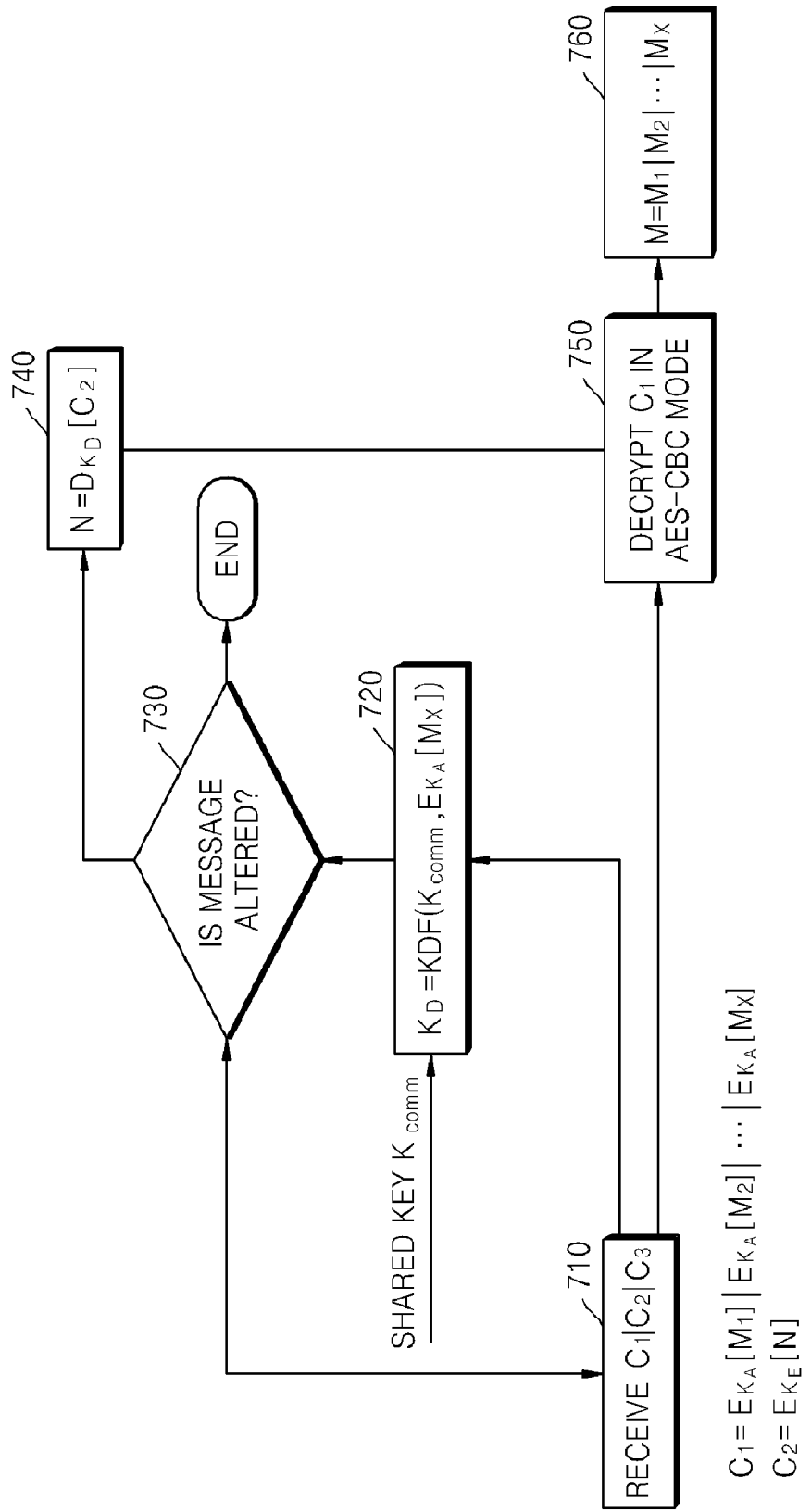
FIG. 7 illustrates a method of decrypting a message in order to maintain the integrity of the message according to a sixth exemplary embodiment of the present invention.

FIG. 7 illustrates a method of decrypting a message in order to maintain the integrity of the message according to a sixth exemplary embodiment of the present invention.

In operation 710, a message obtained by combining a first ciphertext $C_1$ obtained by combining a plurality of message blocks encrypted in the CBC mode of the AES by using a random number N, a second ciphertext $C_2$ obtained by encrypting the random number N by using a encryption key $K_E$, a third ciphertext $C_3$ generated by encrypting a part $E_{K_A}[M_x]$ of the message blocks included in the first ciphertext $C_1$, by using the encryption key $K_E$ or the private key $K_{priv}$ is received.

Here, the encryption key $K_E$ is generated by using the part $E_{K_A}[M_x]$ of the message blocks included in the first ciphertext $C_1$ and the shared key $K_{comm}$.

Here, the third ciphertext $C_3$ generated by using the encryption key $K_E$ may be represented as $E_{K_E}[E_{K_A}[M_x]]$. The third ciphertext $C_3$ generated by the private key $K_{priv}$ may be represented as $E_{K_{priv}}[E_{K_A}[M_x]]$.

In operation 720, the first and second ciphertexts $C_1$ and $C_2$ of the received message are separated from each other. The decryption key $K_D$ is generated by using the part $E_{K_A}[M_x]$ of the message blocks included in the first ciphertext $C_1$ and the shared key $K_{comm}$.

In operation 730, it is determined whether the received message is altered by using the part $E_{K_A}[M_x]$ of the message blocks included in the first ciphertext $C_1$.

At this time, the part of the message blocks included in the first ciphertext $C_1$ may be one or more message blocks. In this case, there has to be a rule for determining which message block included in the first ciphertext $C_1$ is used to generate the encryption key $K_E$.

Preferably, but not necessarily, the part of the message blocks included in the first ciphertext $C_1$ may be the lastly generated message block.

Hereinafter, a method of determining whether the message is altered will be described.

First, a case where the third ciphertext $C_3$ of the received message is generated by using the encryption key $K_E$ will be described.

At this time, the third ciphertext $E_{K_E}[E_{K_A}[M_x]]$ is decrypted by using the decryption key $K_D$.

Next, it is determined whether the message is altered by comparing the part $E_{K_A}[M_x]$ of the message blocks included in the first ciphertext $C_1$ extracted by decoding the third ciphertext $C_3$ with the part of the message blocks included in the first ciphertext $C_1$ used to generate the encryption key $K_E$.

As the result of determination, if it is determined that the received message is altered, the following decryption procedures are stopped.

On the other hand, if the received message is the third ciphertext $C_3$ encrypted by using the private key of the encryption apparatus which encrypts the received message, it is determined whether the received message is altered, by decrypting the third ciphertext $E_{K_{priv}}[E_{K_A}[M_x]]$ by using the public key corresponding to the private key and by comparing the decrypted third ciphertext $E_{K_A}[M_x]$ with the part $E_{K_A}[M_x]$ of the message blocks included in the received first ciphertext $C_1$ used to generate the encryption key $K_E$.

In operation 740, a random number N is extracted by decoding the second ciphertext $C_2$ by using the decryption key $K_D$.

In operation 750, the first ciphertext $C_1$ is decoded in the CBC mode of the AES by using the extracted random number N.

Figure 8:
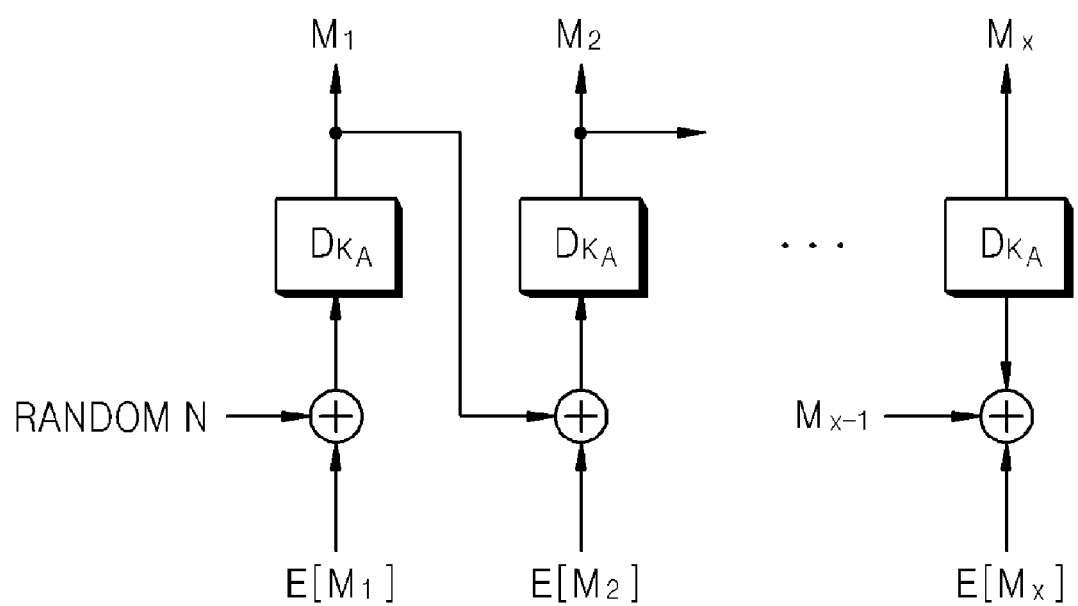
FIG. 8 illustrates a decryption method in the CBC mode of the AES.

FIG. 8 illustrates a decryption method in a CBC mode of the AES.

Referring to FIG. 8, a message block $M_1$ is obtained by decoding a ciphertext $E[M_1]$ by using the decryption key $K_A$ used for decryption in the CBC mode of the AES and by adding a random number N to the ciphertext $E[M_1]$. A message block $M_2$ is obtained by decoding a ciphertext $E[M_2]$ by using the decryption key K and by adding the ciphertext $E[M_1]$ to the ciphertext $E[M_2]$. Messages blocks $M_1$ to $M_x$ can be obtained through the aforementioned decryption procedure.

In operation 760, the message M is generated by combining the plurality of message blocks generated through decryption.

Up to now, the method of encrypting and decrypting a message in order to maintain the integrity of the message according to the exemplary embodiment has been described. Hereinafter, an apparatus for encrypting and decrypting a message in order to maintain the integrity of the message according to an exemplary embodiment of the present invention will be described.

Figure 9:
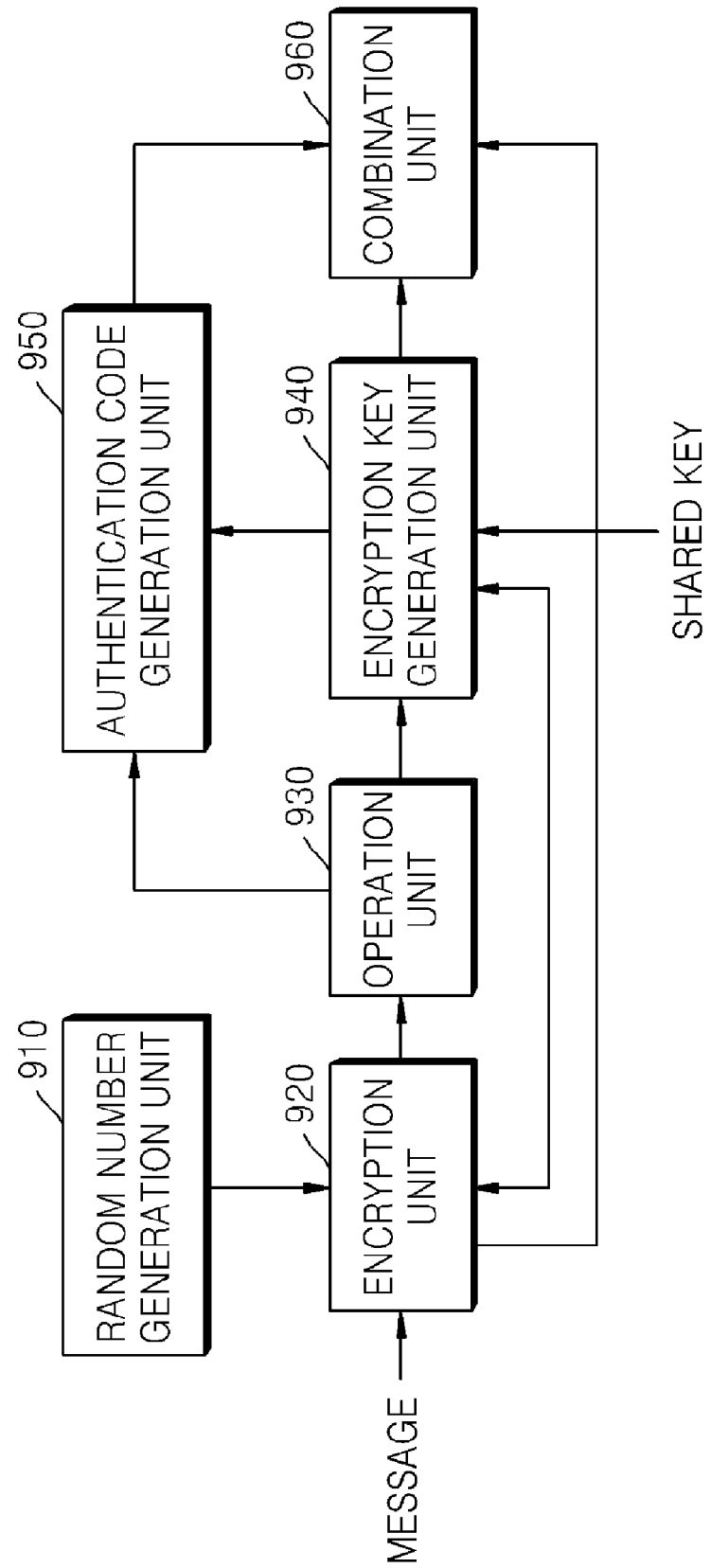
FIG. 9 illustrates an apparatus for encrypting a message in order to maintain the integrity of the message according to a seventh exemplary embodiment of the present invention.

FIG. 9 illustrates an apparatus for encrypting a message in order to maintain the integrity of the message according to a seventh exemplary embodiment of the present invention.

Referring to FIG. 9, the apparatus for encrypting a message in order to maintain the integrity of the message according to an exemplary embodiment of the present invention includes a random number generation unit 910, an encryption unit 920, an operation unit 930, an encryption key generation unit 940, and a combination unit 960.

The random number generation unit 910 generates a random number.

The encryption unit 920 generates a first ciphertext by encrypting a message by using the generated random number.

The operation unit 930 calculates a hash value of the first ciphertext.

The encryption key generation unit 940 generates an encryption key by using the hash value of the first ciphertext and a shared key.

When the operation unit 940 calculates the hash value of the message, an authentication code generation unit 950 generates an authentication code for the hash value by using the encryption key. The encryption unit 920 also generates a second ciphertext by encrypting the random number by using the encryption key generated by the encryption key generation unit 940.

However, the authentication code generation unit may be omitted according to an exemplary embodiment.

The combination unit 960 combines the first and second ciphertexts and the authentication code.

However, the first and second ciphertexts may be combined according to an exemplary embodiment.

Figure 10:
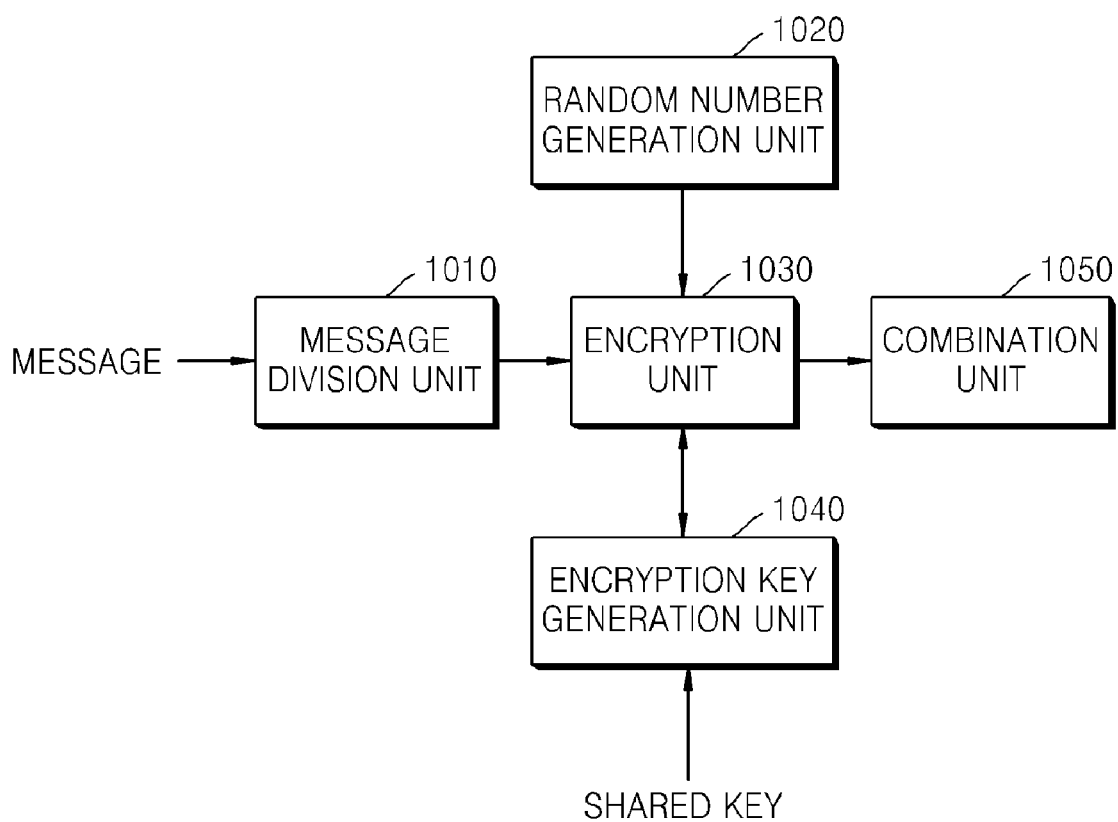
FIG. 10 illustrates an apparatus for encrypting a message in order to maintain the integrity of the message according to an eighth exemplary embodiment of the present invention.

FIG. 10 illustrates an apparatus for encrypting a message in order to maintain the integrity of the message according to an eighth exemplary embodiment of the present invention.

Referring to FIG. 10, the apparatus for encrypting a message in order to maintain the integrity of the message includes a message division unit 1010, a random number generation unit 1020, an encryption unit 1030, an encryption key generation unit 1040, and a combination unit 1050.

The message division unit 1010 generates a plurality of message blocks by dividing a message into the plurality of message blocks.

The random number generation unit 1020 generates a random number used for encryption by the encryption unit 1030.

The encryption unit 1030 generates a plurality of encrypted message blocks by encrypting the plurality of message blocks in the CBC mode of the AES by using the random number generated by the random number generation unit 1020.

The encryption key generation unit 1040 generates an encryption key by using a part of the plurality of message blocks encrypted by the encryption unit 1030 and a shared key.

The encryption unit 1030 generates a second ciphertext by encrypting the random number by using the encryption key generated by the encryption key generation unit 1040.

In addition, the encryption unit 1030 generates a third ciphertext by encrypting a part of message blocks included in the first ciphertext by using the encryption key or a private key of the encryption apparatus.

The combination unit 1050 generates a first ciphertext by combining the plurality of encrypted message blocks, and combines the generated first ciphertext and the second and third ciphertexts generated by the encryption unit 1030.

Figure 11:
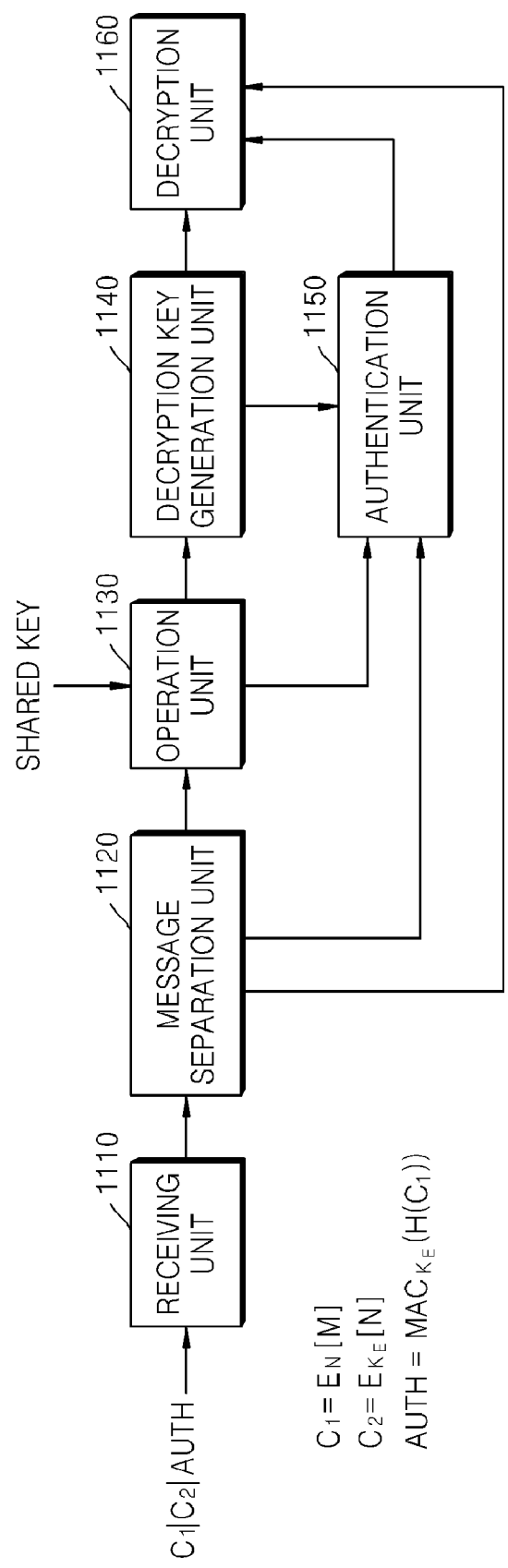
FIG. 11 illustrates an apparatus for decrypting a message in order to maintain the integrity of the message according to a ninth exemplary embodiment of the present invention.

FIG. 11 illustrates an apparatus for decrypting a message in order to maintain the integrity of the message according to a ninth exemplary embodiment of the present invention.

Referring to FIG. 11, the apparatus for decrypting a message in order to maintain the integrity of the message according to the exemplary embodiment includes a receiving unit 1110, a message separation unit 1120, an operation unit 1130, a decryption key generation unit 1140, an authentication unit 1150, and a decryption unit 1160.

The receiving unit 1110 receives a message obtained by combining a first ciphertext encrypted by using a random number, a second ciphertext obtained by encrypting the random number by using an encryption key generated by using the hash value of the first ciphertext and a shared key, and an authentication code for the hash value of the first ciphertext generated by using the encryption key.

However, the receiving unit 1110 may receive a message obtained by combining the first and second ciphertexts according to an exemplary embodiment. Selectively, the receiving unit 1110 may receive a message obtained by combining the first and second ciphertexts and the third ciphertext obtained by encrypting the hash value of the first ciphertext by using a private key of the encryption apparatus which encrypts the received message instead of combining the first and second ciphertexts and the authentication code.

The message separation unit 1120 separates the first and second ciphertexts of the received message from each other.

The operation unit 1130 calculates the hash value of the separated first encryption.

The decryption key generation unit 1140 generates a decryption key by using the hash value of the first ciphertext and the shared key.

The authentication unit 1150 determines whether the received message is altered.

Figure 12:
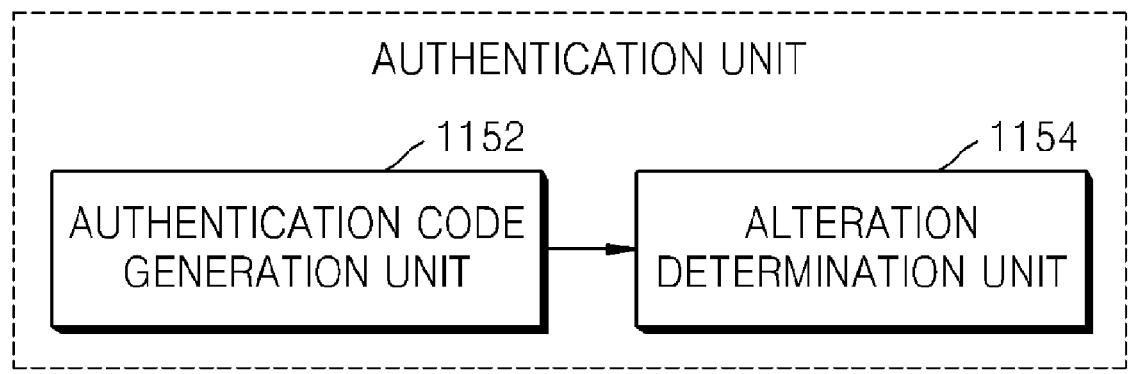
FIG. 12 illustrates an authentication unit according to a tenth exemplary embodiment of the present invention.

FIG. 12 illustrates an authentication unit according to a tenth exemplary embodiment of the present invention.

Referring to FIG. 12, the authentication unit according to the exemplary embodiment includes an authentication code generation unit 1152 and an alteration determination unit 11154.

If the received message is obtained by combining the first and second ciphertexts and the authentication code, the authentication code generation unit 1152 generates the authentication code for the hash value of the first ciphertext.

The alteration determination unit 1154 determines whether the received message is altered by comparing the authentication code generated by using the decryption key with the authentication code received by the receiving unit 1110.

On the other hand, if the received message is encrypted by using a private key of the encryption apparatus which encrypts the first and second ciphertexts and the received message, and if the decryption unit 1160 decrypts the third ciphertext by using a public key corresponding to the private key, the authentication unit according to another exemplary embodiment of the present invention determines whether the received message is altered by comparing the hash value of the first ciphertext extracted by decrypting the third ciphertext with the hash value of the first ciphertext calculated from the first ciphertext received by the receiving unit 1110.

The decryption unit 1160 extracts a random number by decrypting the second ciphertext by using the decryption key and decrypts the first ciphertext by using the extracted random number.

As the result of determination of the authentication unit 1150, if it is determined that the received message is altered, the decryption unit 1160 stops decryption for the second ciphertext. That is, only if the received message is not altered, the decryption unit 1160 performs the decryption procedure and outputs the message.

Figure 13:
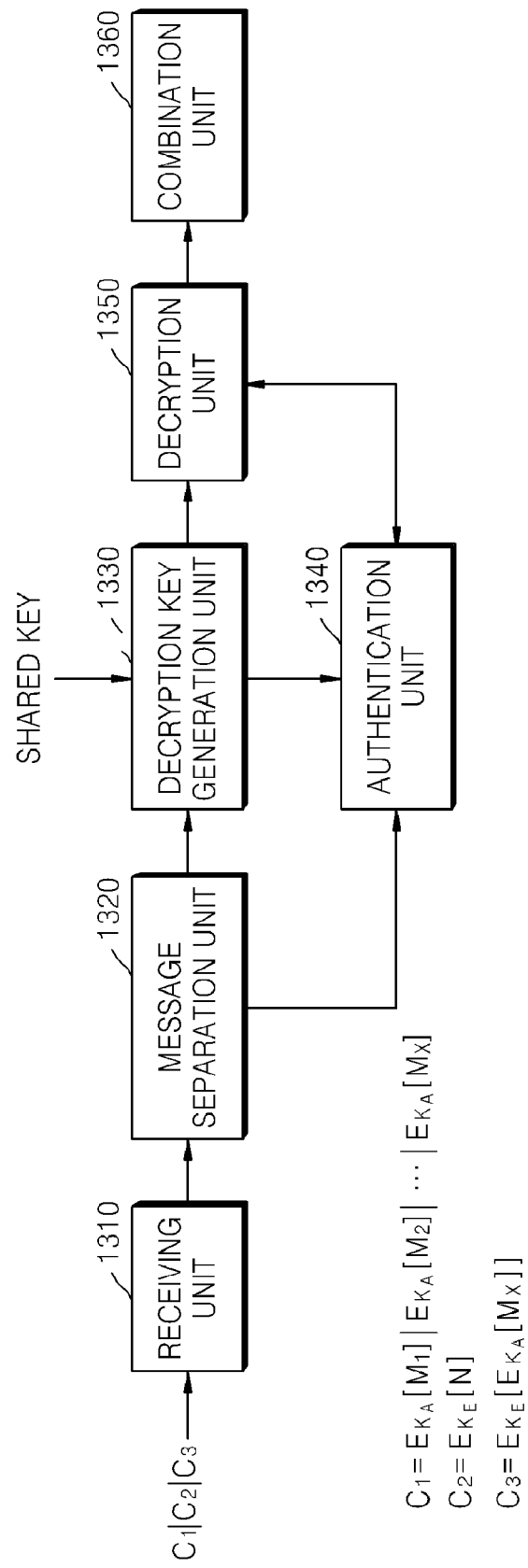
FIG. 13 illustrates an apparatus for decrypting a message in order to maintain the integrity of the message according to an eleventh exemplary embodiment of the present invention.

FIG. 13 illustrates an apparatus for decrypting a message in order to maintain the integrity of the message according to an eleventh exemplary embodiment of the present invention.

Referring to FIG. 13, the apparatus for decrypting a message in order to maintain the integrity of the message according to the exemplary embodiment includes a receiving unit 1310, a message separation unit 1320, a decryption key generation unit 1330, an authentication unit 1340, a decryption unit 1350, and a combination unit 1360.

The receiving unit 1310 receives a message obtained by combining a first ciphertext obtained by combining a plurality of message blocks encrypted in the CBC mode of the AES, a second ciphertext generated by encrypting a random number by using an encryption key, and a third ciphertext generated by encrypting the encryption key or a private key of an encryption apparatus which encrypts the received message.

At this time, the first and second ciphertexts may be received.

The message separation unit 1320 separates the first to third ciphertexts from one another.

The decryption key generation unit 1330 generates a decryption key by using a part of message blocks included in the first ciphertext and the shared key.

If the third ciphertext combined with the received message is encrypted by using the encryption key, the authentication unit 1340 determines whether the received message is altered by allowing the decryption unit to decrypt the third ciphertext, by receiving the decryption result obtained by decrypting the third ciphertext from the decryption unit 1350, and by comparing the decryption result value with a part of the message blocks included in the first ciphertext received by the receiving unit used to generate the encryption key.

In addition, if the third ciphertext combined with the received message is encrypted by using the private key of the encryption apparatus which encrypts the received message, the authentication unit 1340 allows the decryption unit 1350 to decrypt the third ciphertext by using a public key corresponding to the private key and determines by using the decryption result obtained by decrypting the third ciphertext whether the received message is altered.

The decryption unit 1350 extracts the random number by decrypting the second ciphertext by using the decryption key and decrypts the first ciphertext in the CBC mode of the AES by using the extracted random number. At this time, if it is determined by the authentication unit 1340 that the received message is altered, the decryption unit does not decrypt the second ciphertext. That is, only if the received message is not altered, the decryption message 1150 performs the decryption procedure and finally outputs the message.

The combination unit 1360 generates the message by combining the plurality of message blocks decrypted by the decryption unit 1350 in the CBC mode of the AES.

In the present invention, a random number is generated, a first ciphertext is generated by encrypting a message by using the generated random number, an encryption key is generated by using a hash value of the first ciphertext and a shared key, a second ciphertext is generated by encrypting the random number by using the encryption key, and the first and second ciphertexts are combined. Accordingly, it is possible to prevent the encrypted message of which message integrity is broken from being reused.

The exemplary embodiments of the present invention can be written as computer programs and can be implemented in general-use digital computers that execute the programs using a computer readable recording medium.

Examples of the computer readable recording medium include magnetic storage media (e.g., read-only memory (ROM), floppy disks, hard disks, etc.), optical recording media (e.g., compact disk (CD)-ROMs, or digital versatile disks (DVDs)), and storage media such as carrier waves (e.g., transmission through the Internet).

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of encrypting a message of an encryption apparatus, the method comprising:
   generating a random number and generating, by a computer device, a first ciphertext by encrypting the message by using the random number;
   calculating a hash value of the first ciphertext;
   generating an encryption key by a key derivation function to which the hash value of the first ciphertext and a shared key are separately input;
   generating a second ciphertext by encrypting the random number by using the encryption key; and
   combining the first ciphertext and the second ciphertext.

2. The method of claim 1, further comprising:
   calculating a hash value of the message; and
   generating an authentication code for the hash value of the message by using the encryption key,
   wherein in the combining of the first ciphertext and the second ciphertext comprises combining the first ciphertext, the second ciphertext, and the authentication code for the hash value of the message.

3. The method of claim 1, further comprising generating an authentication code for the hash value of the first ciphertext by using the encryption key,
   wherein the combining of the first ciphertext and the second ciphertext comprises combining the first ciphertext, the second ciphertext, and the authentication code for the hash value of the first ciphertext.

4. The method of claim 2, wherein the authentication code is constructed by using a message authentication code (MAC).

5. The method of claim 1, further comprising:
   calculating a hash value of the message; and
   generating a third ciphertext by encrypting the hash value of the message by using a private key of the encryption apparatus,
   wherein the combining of the first ciphertext and the second ciphertext comprises combining the first, the second, and the third ciphertexts.

6. The method of claim 1, further comprising generating a third ciphertext by encrypting the hash value of the first ciphertext by using a private key of the encryption apparatus,
   wherein the combining of the first ciphertext and the second ciphertext comprises combining the first, the second, and the third ciphertexts.

7. The method of claim 1,
   wherein in the generating the encryption key, the encryption key is generated by using a key derivation function (KDF) which generates the encryption key, having the hash value of the first ciphertext and the shared key, and
   wherein the KDF is shared by the encryption apparatus and a decryption apparatus which decrypts the encrypted message.

8. The method of claim 1, wherein the shared key is shared by the encryption apparatus and a decryption apparatus which decrypts the encrypted message.

9. The method of claim 1, wherein the message includes at least one of texts, audios, videos and images.

10. A method of encrypting a message of an encryption apparatus, the method comprising:
   generating a plurality of message blocks by dividing the message;
   generating a random number and encrypting the plurality of message blocks in a cipher block chaining (CBC) mode of the advanced encryption standard (AES) function to which the random number is input;
   generating an encryption by a key derivation function to which a part of the plurality of encrypted message blocks and a shared key are separately input;
   generating, by a computer device, a first ciphertext by combining the plurality of encrypted message blocks;
   generating a second ciphertext by encrypting the random number by using the encryption key; and
   combining the first ciphertext and the second ciphertext.

11. The method of claim 10, further comprising generating a third ciphertext by encrypting the part of the plurality of encrypted message blocks by using at least one of the encryption key and a private key of the encryption apparatus,
wherein the combining of the first ciphertext and the second ciphertext comprises combining the first, the second, and the third ciphertexts.

12. The method of claim 10, wherein the part of the plurality of encrypted message blocks is an encrypted message block which is generated last from among the plurality of encrypted message blocks.

13. The method of claim 10, wherein the shared key is shared by the encryption apparatus and a decryption apparatus which decrypts the encrypted message.

14. A method of decrypting an encrypted message, the method comprising:
receiving the encrypted message that comprises a first ciphertext and a second ciphertext, wherein the first ciphertext is obtained by encrypting a message by using a random number, and wherein the second ciphertext is obtained by encrypting the random number by using an encryption key that is generated by using a hash value of the first ciphertext and a shared key;
separating the first ciphertext and the second ciphertext and calculating the hash value of the first ciphertext;
generating a decryption key by a key derivation function to which the hash value of the first ciphertext and the shared key are separately input;
extracting the random number by decrypting the second ciphertext by using the decryption key; and
decrypting, by a computer device, the first ciphertext by using the random number.

15. The method of claim 14, further comprising determining whether the encrypted message is altered by comparing the decryption key with the encryption key.

16. The method of claim 14, further comprising determining whether the encrypted message is altered,
wherein the encrypted message further comprises at least one of:
an authentication code for the hash value of the first ciphertext generated by using the encryption key; and
a third ciphertext obtained by encrypting the hash value of the first ciphertext by using a private key of an encryption apparatus that generates the encryption key,
wherein in the extracting the random number, the second ciphertext is selectively decrypted based on a result of the determining whether the encrypted message is altered.

17. The method of claim 16,
wherein if the encrypted message further comprises the authentication code, the determining whether the encrypted message is altered comprises:
generating an authentication code for the hash value of the first ciphertext by using the decryption key; and
determining whether the received message is altered by comparing the generated authentication code with the authentication code included in the encrypted message, and
wherein if the encrypted message further comprises the third ciphertext, the determining whether the encrypted message is altered comprises:
decrypting the third ciphertext by using a public key corresponding to the private key to extract the hash value of the first ciphertext; and
determining whether the received message is altered by comparing the hash value of the first ciphertext extracted by decrypting the third ciphertext and the hash value calculated from the first ciphertext.

18. A method of decrypting an encrypted message, the method comprising:
receiving the encrypted message comprising a first ciphertext and a second ciphertext, wherein the first ciphertext comprises a plurality of encrypted message blocks obtained by encrypting a plurality of message blocks in a cipher block chaining (CBC) mode of the advanced encryption standard (AES) function to which a random number is input, and wherein the second ciphertext is generated by encrypting the random number by using an encryption key;
separating the first ciphertext and the second ciphertext and generating a decryption key by using a part of the plurality of encrypted message blocks and a shared key;
extracting the random number by decrypting the second ciphertext by using the decryption key; and
decrypting, by a computer device, the first ciphertext by using the random number and generating a decrypted message by combining a plurality of decrypted message blocks,
wherein the encryption key is generated by a key derivation function to which the part of the plurality of encrypted message blocks and the shared key are separately input.

19. The method of claim 18,
wherein the receiving the encrypted message further comprises determining whether the encrypted message is altered,
wherein the encrypted message further comprises a third ciphertext encrypted by using at least one of the encryption key and a private key of an encryption apparatus which generates the encrypted message, and
wherein in the extracting the random number, the second ciphertext is selectively decrypted based on a result of the determining whether the encrypted message is altered.

20. The method of claim 19,
wherein if the third ciphertext is encrypted by using the encryption key, the determining whether the encrypted message is altered comprises:
decrypting the third ciphertext by using the encryption key; and
determining whether the encrypted message is altered by comparing a result value obtained by the decrypting the third ciphertext with the part of the plurality of message blocks included in the first ciphertext used to generate the encryption key, and
wherein if the third ciphertext is encrypted by using a private key, the determining whether the encrypted message is altered comprises:
decrypting the third ciphertext by using a public key corresponding to the private key; and
determining whether the received message is altered by comparing a result value obtained by the decrypting the third ciphertext with the part of the plurality of message blocks included in the first ciphertext used to generate the encryption key.

21. A non-transitory computer-readable recording medium having embodied thereon a computer program for executing the method of claim 1.

* * * * *